Dec. 23, 1969  R. E. DIXON  3,485,890
CONVERSION OF PROPYLENE INTO ETHYLENE
Filed April 3, 1967
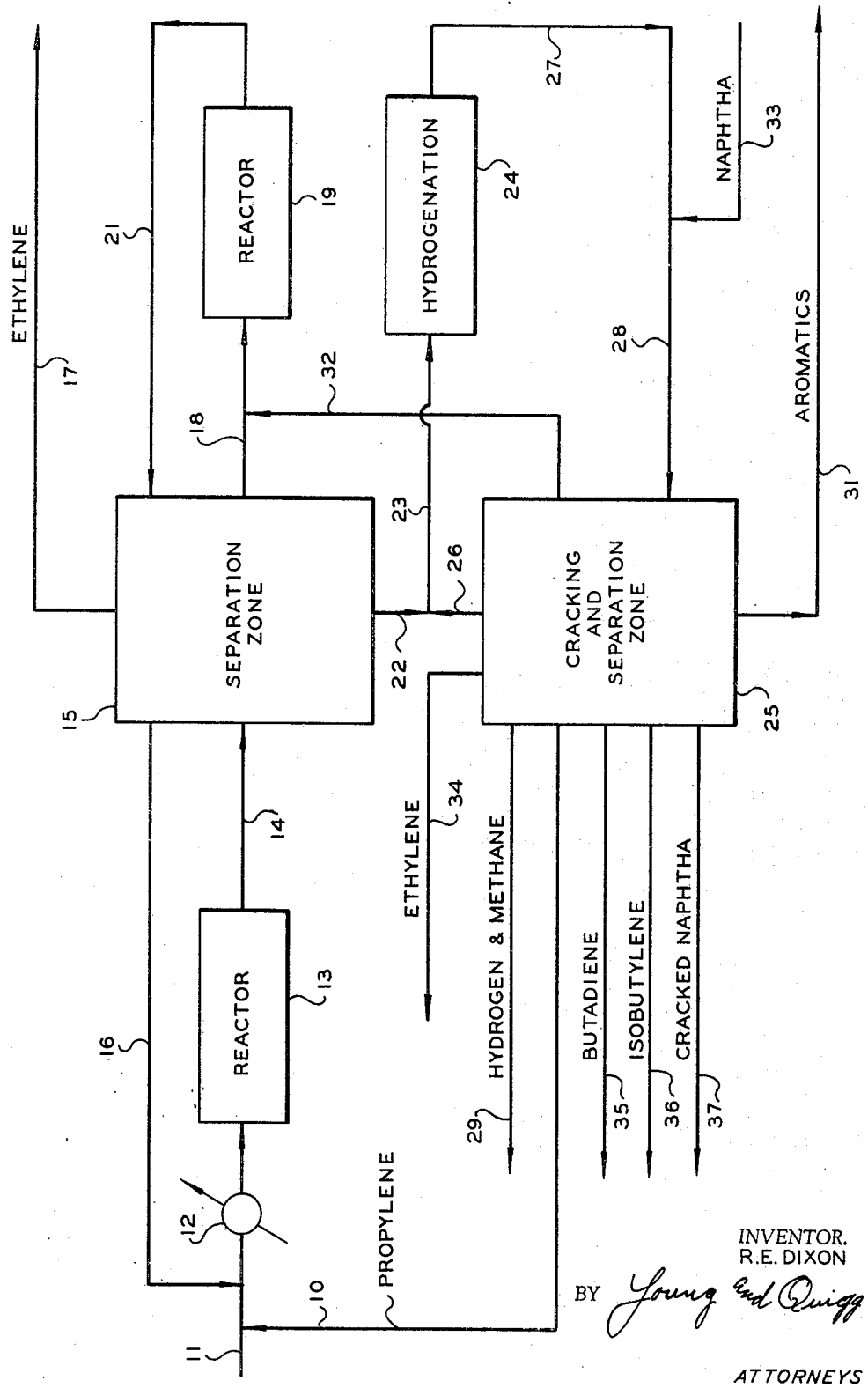
INVENTOR.
R.E. DIXON
BY Young and Quigg
ATTORNEYS 3,485,890
CONVERSION OF PROPYLENE INTO ETHYLENE
Rolland E. Dixon, Bartlesville, Okla., assignor to Phillips
 Petroleum Company, a corporation of Delaware
Filed Apr. 3, 1967, Ser. No. 627,761
Int. Cl. C07c 3/62
U.S. Cl. 260—683                                         4 Claims

ABSTRACT OF THE DISCLOSURE

Propylene is converted to ethylene by (1) disproportionating propylene to ethylene and butenes, (2) converting butenes over a disproportionation catalyst to ethylene, pentenes and hexenes, (3) hydrogenating the pentenes and hexenes to pentanes and hexanes, (4) passing the pentanes and hexanes to a naphtha cracker, and (5) passing propylene from the naphtha cracker to (1).

---

This invention relates to a method for converting propylene into ethylene. In one aspect this invention relates to a combination of the olefin reaction process and a naptha cracking operation to produce ethylene. In another aspect this invention relates to a method for converting propylene substantially completely to ethylene. In still another aspect this invention relates to a unified process wherein propylene is disproportionated into ethylene and butene and the butene is then converted into additional ethylene and higher boiling olefins which are then hydrogenated and returned to a naphtha cracking step for the production of additional ethylene and additional propylene feed.

The olefin reaction is defined as a process for the catalytic conversion over a catalyst of a feed comprising one or more ethylenically unsaturated compounds to produce a resulting product which contains at least 10 percent by weight of product compounds, which product compounds can be visualized as resulting from at least one primary reaction, as defined below or the combination of at least one primary reaction and at least one unsaturated bond isomerization reaction, wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than 25 percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules. Olefin reactions according to the above definition which are applicable for use in the present invention include the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; and the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and butene-1 yields ethylene and pentene-2.

It is an object of this invention to provide a method for converting propylene substantially completely into ethylene. It is also an object of this invention to provide a unitary process comprising a combination of a naphtha cracking step and olefin conversion process steps to convert propylene substantially completely into ethylene. Other objects, aspects, and advantages of this invention will become apparent to one skilled in the art upon studying this disclosure including the detailed description of the invention and the appended drawing wherein:

The sole figure is a schematic flow diagram of a preferred embodiment of the invention.

According to this invention, propylene is disproportionated over a disproportionation catalyst to produce ethylenes and butenes. The ethylene is recovered as product and the butenes are passed to a second conversion zone containing therein a disproportionation catalyst and are converted, by the olefin reaction, into additional ethylene, propylene, pentenes, and hexenes. The ethylene is recovered as product, the propylene is recycled to feed, and the pentenes and hexenes are then hydrogenated and passed to a naphtha cracking step. Propylene produced in the naptha cracking step provides the feed to the propylene disproportionation step. Thus, according to the present invention, propylene is converted substantially in toto to ethylene. The heavier products can be recycled to extinction in the naptha cracker. The make-up feed can be additional feed added to the naptha cracker or can be propylene from an outside source. Hydrogen produced in the naptha cracking step can be utilized to provide the hydrogen in the hydrogenation of the pentenes and hexenes. Methane, hydrogen, and a relatively small amount of heavy aromatics are the only by-products from the naphtha cracking step.

The primary starting material can be propylene, as stated above, or can be butenes or naphtha since butenes and naphtha will provide, via the naphtha cracker, the propylene for the propylene disproportionation step. Thus, the make-up feed can be butenes introduced into line 18 as well as propylene via line 11 or naphtha via line 33.

The present invention provides a unitary process for the conversion of propylene substantially completely into ethylene by reacting propylene and the butenes formed as a result, over a disproportionation catalyst to produce ethylene and to produce pentenes and heavier which are hydrogenated and recycled to extinction in the naphtha cracker which provides the propylene feed for the process.

The catalysts which are useful for the present invention are those which have activity for the disproportionation of propylene into ethylene and butenes. Some examples of such catalysts are (1) Silica or thoria promoted by an oxide or compound convertible to an oxide by calcination or sulfide of tungsten or molybdenum or by an oxide or compound convertible to an oxide by calcination of rhenium, vanadiums, niobium, tellurium or tantalum;

(2) Alumina promoted with an oxide or compound convertible to an oxide by calcination of molybdenum, tungsten, or rhenium; a sulfide of tungsten or molybdenum; or an alkali metal salt, ammonium salt, alkaline earth metal salt, or bismuth salt of phosphomolybdic acid;

(3) One or more of the group zirconia, aluminum phosphate, zirconium phosphate, calcium phosphate, magnesium phosphate, or titanium phosphate promoted by one or more of a sulfide of molybdenum or tungsten, or an oxide or compound convertible to an oxide by calcination of molybdenum, tungsten, vanadium, niobium, tantalum or rhenium or magnesium tungstate or beryllium phosphotungstate; and (4) Silica, alumina, zirconia, aluminum phosphate, zirconium phosphate, calcium phosphate, magnesium phosphate, or titanium phosphate promoted by a hexacarbonyl of molybdenum or tungstne.

The catalysts of (1) can be prepared and activated by conventional techniques such as by combining a catalyst grade silica with suitable tungsten, molybdenum, rhenium, vanadium, niobium, tellurium, or tantalum compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activated by heating in an inert atmosphere.

The catalysts of (2) can be prepared and activated by conventional techniques such as by combining catalyst grade alumina with an oxide or a compound convertible to an oxide by calcination of molybdenum, tungsten or rhenium and calcining the resulting mixture after removal of any solvent used in the impregnation. The sulfides of tungsten or molybdeum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively, the support material, such as zirconia, can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and beryllium phosphotungstate can be dry mixed with titanium phosphate, for example, and activated by calcination in the air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalytic agent is considered to be the reaction product resulting from the admixture of the support material and the promoter material which is subjected to activation treatment.

The operating temperature for the process of this invention when using catalysts of (1) is in the range of about 400 to 1100° F. The process of this invention when using the catalysts of (2) will be operated at a temperature in the range of about 150 to 500° F. The process using the catalysts of (3) will be carried out at a temperature of about 600 to 1200° F. The process using the catalysts of (4) will be carried out at a temperature of about 0 to 600° F. In the process of the invention, pressures are not important but will be in the range of about 0 to 2,000 p.s.i.g.

Some catalysts applicable for use in the olefin reaction steps of the present invention are also disclosed in U.S. Patent 3,261,879, issued July 19, 1966, and in application Ser. Nos. 336,624, filed Jan. 9, 1964; now Patent No. 3,340,322; 412,343, filed Nov. 19, 1964, now Patent No. 3,395,196; 421,692, filed Dec. 28, 1964, now Patent No. 3,418,390; 517,905, filed Jan. 3, 1966; 517,918, filed Jan. 3, 1966; and 502,544, filed Oct. 25, 1965, now abandoned.

The preferred catalysts are those which are used at relatively high temperatures such as those of the groups (1) and (3). A particularly preferred catalyst is tungsten oxide supported on silica.

It is sometimes advantageous to treat the catalyst with an inorganic base following the conventional heating. Such inorganic base can be a alkali metal compound or an alkaline earth metal compound such as the oxides, hydroxides, carbonates, nitrates, or halides of an alkali metal or an alkaline earth metal. Suitable metal compounds include the oxides, hydroxides, carbonates, bicarbonates, sulfates, halides, nitrates, acetates, and the like of lithium, sodium, potassium, rubidium, cesium, calcium, strontium, or barium. Sodium hydroxide, potassium hydroxide, sodium carbonate, potassium chloride, barium hydroxide, and cesium hydroxide are representative of the applicable compounds useful in treating the catalysts. The alkali metal or alkaline earth metal compound can be incorporated into the catalyst composition advantageously by impregnating the catalyst with an aqueous solution of a compound calcinable to the oxide or to the metal after which the water is evaporated and the catalyst calcined, by conventional activation treatment.

In general, with a fixed bed reactor and continuous flow operation, weight hourly space velocities in the range of 0.5 to 1000 parts by weight of hydrocarbon feed per part by weight of catalyst per hour are suitable, with excellent results having been obtained in the range of 1 to 500, higher conversion being obtained in the range of 1 to 200. These rates remain constant for changes in density of the feed due to changes in pressure or temperature, but must be adjusted according to the activity of the catalyst and the reaction temperature. At a given temperature, space rate can be varied appreciably, within the stated limits, without substantial loss of efficiency. Space rates given in the examples in this application result in weight hourly space rates in the range of 0.5 to 1000.

The olefin reaction can be carried out either in the presence or absence of a diluent. Diluents selected from the group consisting of paraffinic and cycloparaffinic hydrocarbons can be employed. Suitable diluents are, for example, propane, cyclohexane, methylcyclohexane, normal pentane, normal hexane, isooctane, dodecane, and the like, or mixtures thereof, including primarily those paraffins and cycloparaffins having up to 12 carbon atoms per molecule. The diluent should be nonreactive under the conditions of the olefin reaction.

Referring now to the drawing, propylene is passed via conduits 10 and 11 and heat exchanger 12 to reactor 13 containing therein a catalyst active for the disproportionation of propylene into ethylene and butenes and disproportionated to ethylene and butenes. The effluent from reactor 13 comprising ethylene, butene-1 and butene-2, and unconverted propylene is passed via conduit 14 to separation zone 15 which can be one or more distillation columns for the separation of the products. Propylene is recycled from separation zone 15 back to conduit 11 via conduit 16. Ethylene is removed as product via conduit 17. Butene-1 and butene-2 are passed via conduit 18 to reactor 19 which contains therein a catalyst active for the disproportionation of propylene into ethylene and butenes. The effluent from reactor 19 comprising ethylene, propylene, unreacted butenes, pentenes, hexenes and a small amount of heptenes and heavier is passed via conduit 21 to separation zone 15. Pentenes, hexenes, heptenes and heavier are passed from separation zone 15 via conduits 22 and 23 to hydrogenation zone 24. Hydrogen from cracking and separation zone 25 is passed via conduits 26 and 23 to hydrogenation zone 24 and the hydrocarbons are hydrogenated to produce pentanes, hexanes, heptanes and heavier paraffin hydrocarbons which are passed via conduit 27 and conduit 28 to cracking and separation zone 25. Cracking and separation zone 25 can conveniently comprise a conventional naphtha cracking unit and such auxiliary separation facilities as are required to remove methane and the excess hydrogen, over that which is required in hydrogenation zone 24, and heavy aromatic oils which are relatively refractory in the naphtha cracker. Hydrogen and methane are removed via conduit 29. The heavy aromatic oils are removed via conduit 31. If desired, butene-1 and butene-2, produced in the naphtha cracker, can be passed to reactor 19 via conduits 32 and 18. Make-up naphtha is added to the naphtha cracker via conduits 33 and 28. Additional propylene can be added from an outside source via conduit 11 if such is desired. An ethylene product stream is also removed from cracking and separation zone 25 via conduit 34. Butadiene and isobutylene product streams are removed via conduits 35 and 36 and cracked naphtha for hydrogenation and recycle to the naphtha cracker is removed via conduit 37.

It is to be understood that certain items of conventional equipment such as valves, pumps, meters and the like have been omitted from the drawing in order to simplify presentation of the invention. Those skilled in the art will have no difficulty in recognizing the need for such items of equipment and how their use is to be incorporated into the process.

The following specific embodiment will be helpful in attaining an understanding of the invention; however, it should be understood that the specific embodiment presented herein is exemplary and should not be used to limit the invention unduly.

EXAMPLE

In a system as illustrated in the drawing, reactor 13 contains a catalyst comprising silica promoted with about 8 percent tungsten oxide. The operating temperature is about 750° F., the pressure is about 300 p.s.i.g., and the space velocity is about 30 parts by weight of feed per part by weight of catalyst per hour. Reactor 19 contains a catalyst which is the same as that in reactor 13, the operating temperature is 750° F., pressure is 300 p.s.i.g. and space velocity is 100 parts by weight of feed per part by weight of catalyst per hour.

The following Table I shows a material balance of the operation applicable to the invention. Product stream from the naphtha cracker which do not enter into the process of the invention are not shown separately.

TABLE I.—MOLS PER HOUR

| Components | 10 | 32 | 16 | 11 | 14 | 17 | 18 | 21 | 22 | 26 | Naphtha cracker effluent |
|---|---|---|---|---|---|---|---|---|---|---|---|
| Hydrogen | | | | | | | | | | 303 | 619 |
| Methane | | | | | | | | | | | 2,300 |
| Ethylene | | | 129 | 122 | 646 | 550 | | 33 | | | 2,300 |
| Ethane | | | | | | | | | | | 1 |
| Propylene | 803 | | 1,929 | 2,727 | 1,684 | | 10 | 303 | | | 803 |
| Propane | 91 | | 5 | 96 | 96 | | 10 | 10 | | | 91 |
| Isobutylene | | | | | | | | | | | 101 |
| Butadiene | | | | | | | | | | | 160 |
| n-Butylenes | | 115 | | | 514 | | 986 | 487 | 11 | | 115 |
| Butanes | | | | | | | | | | | |
| Pentenes | | | | | 5 | | 5 | 221 | 221 | | 97 |
| Pentanes | | | | | | | | | | | |
| Hexenes | | | | | | | | 72 | 72 | | 45 |
| Heptenes | | | | | | | | | | | 23 |
| C+olefins | | | | | | | | | | | 84 |
| Aromatics | | | | | | | | | | | 306 |
| Total | 894 | 115 | 2,063 | 2,945 | 2,945 | 550 | 1,011 | 1,126 | 304 | 303 | +Fuel oil |

Ethylene yield=500+2300 _____ 2850
Isobutylene _____ 101
Butadiene _____ 160
Dearomatized cracked naphtha (to hydrogenation for recycle) _____ 555
Aromatics (50 percent benzene) _____ 306

That which is claimed is:

1. A process for producing ethylene from propylene which comprises disproportionating propylene in the presence of a disproportionation catalyst in a first conversion zone to produce ethylene and butenes;
    recovering the ethylene as product;
    converting the butenes in the presence of a disproportionation catalyst in a second conversion zone to produce ethylene, propylene, pentenes and hexenes;
    hydrogenating the pentenes and hexenes in a hydrogenation zone to produce pentanes and hexanes;
    passing the pentanes and hexanes to a cracking step to produce products of cracking including propylene; and
    passing the propylene to said first conversion zone.

2. The process of claim 1 wherein the propylene produced in the second disproportionation step is returned to the first disproportionation step.

3. The process of claim 1 wherein hydrogen produced in the cracking step is utilized in the hydrogenation zone to hydrogenate the pentenes and hexenes.

4. The process of claim 1 wherein the propylene disproportionated in the first disproportionation zone is obtained from the catalytic cracking step.

References Cited

UNITED STATES PATENTS 3,281,351  10/1966  Gilliland et al. _____ 260—683
3,330,882   7/1967  Albright _____ 260—683
3,345,285  10/1967  Hutto et al. _____ 260—683
3,409,540  11/1968  Gould et al. _____ 260—683

DELBERT E. GANTZ, Primary Examiner

C. E. SPRESSER, Assistant Examiner

U.S. Cl. X.R.

208—67